(12) United States Patent
Ramachandra Iyer (10) Patent No.: US 10,885,119 B2
(45) Date of Patent: Jan. 5, 2021

(54) METHOD AND SYSTEM FOR PROCESSING MULTIMODAL USER QUERIES

(71) Applicant: WIPRO LIMITED, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 302 days.

(21) Appl. No.: 15/873,921

(22) Filed: Jan. 18, 2018

(65) Prior Publication Data
US 2019/0163838 A1    May 30, 2019

(30) Foreign Application Priority Data
Nov. 24, 2017   (IN) .............................. 201741042238

(51) Int. Cl.
| G06F 16/00 | (2019.01) |
| G06F 16/9032 | (2019.01) |
| G06N 20/00 | (2019.01) |
| G06F 16/904 | (2019.01) |
| G06F 16/903 | (2019.01) |

(52) U.S. Cl.
CPC ...... *G06F 16/90332* (2019.01); *G06F 16/904* (2019.01); *G06F 16/90344* (2019.01); *G06N 20/00* (2019.01)

(58) Field of Classification Search
CPC ......... G06F 16/90332; G06F 16/90344; G06F 16/904; G06N 20/00; G06N 7/005
See application file for complete search history.

(56) References Cited

U.S. PATENT DOCUMENTS

| 5,748,841 | A | 5/1998 | Morin et al. |
| 6,346,952 | B1 | 2/2002 | Sfitivelman |
| 7,630,959 | B2 * | 12/2009 | Chang ................. G06F 16/3322 |
| 7,827,125 | B1 * | 11/2010 | Rennison .............. G06F 16/319 |
| | | | 706/14 |
| 8,095,371 | B2 | 1/2012 | Horioka et al. |
| 2005/0069122 | A1 | 3/2005 | Lin |
| 2007/0078815 | A1 * | 4/2007 | Weng .................. G06F 16/3329 |
| 2010/0332498 | A1 * | 12/2010 | Svore .................... G06F 16/345 |
| | | | 707/759 |
| 2011/0010694 | A1 * | 1/2011 | De Jong ............... G06F 16/245 |
| | | | 717/139 |

(Continued)

*Primary Examiner* — Shiow-Jy Fan
(74) *Attorney, Agent, or Firm* — Finnegan, Henderson, Farabow, Garrett & Dunner, LLP (57) ABSTRACT

Disclosed herein is method and system for processing multimodal user queries. The method comprises determining availability of one or more responses to each of one or more sub-queries, wherein the one or more sub-queries are formed by splitting the multimodal user queries. The method detects requirement of an expert to provide the one or more responses upon determining at least one of unavailability of the one or more responses by the response generation system or based predefined conditions. Thereafter, a summarized content is generated by summarizing context of the one or more sub-queries and historical conversation data associated with the one or more sub-queries. Based on the summarized content, the one or more sub-queries are reformulated. Finally, the one or more responses received, from the expert, for the reformulated one or more sub-queries are collated provided as the one or more responses for the multimodal user queries.

16 Claims, 4 Drawing Sheets

(56) References Cited

U.S. PATENT DOCUMENTS

| | | | |
|---|---|---|---|
| 2011/0066618 A1* | 3/2011 | Sigurbjornsson | G06F 16/9535 707/739 |
| 2011/0295836 A1* | 12/2011 | Bolsius | G06F 16/243 707/714 |
| 2012/0005219 A1* | 1/2012 | Apacible | G06F 16/334 707/768 |
| 2014/0136212 A1* | 5/2014 | Kwon | G10L 15/22 704/275 |
| 2015/0039579 A1* | 2/2015 | Clark | G06F 16/9535 707/706 |
| 2015/0310005 A1* | 10/2015 | Ryger | G06F 16/93 707/706 |
| 2016/0098994 A1 | 4/2016 | Gelfenbeyn et al. | |
| 2016/0196312 A1* | 7/2016 | Bastide | G06F 16/3329 707/776 |
| 2018/0089312 A1* | 3/2018 | Pal | G06F 16/2471 |
| 2018/0349377 A1* | 12/2018 | Verma | G06N 5/022 |
| 2019/0050406 A1* | 2/2019 | Nguyen | G06Q 10/107 |

\* cited by examiner

METHOD AND SYSTEM FOR PROCESSING MULTIMODAL USER QUERIES

TECHNICAL FIELD

The present subject matter is generally related to artificial intelligence and more particularly, but not exclusively, to a method and system for processing multimodal user queries for generating automated responses.

BACKGROUND

Multimodal cognitive systems are increasingly becoming popular in generating responses for user queries. The existing systems involve obtaining responses from an expert for a user query, when the system is unable to provide the responses. To that end, a system may invoke a communication session with the expert to provide the responses. So, when the expert is looped in, the expert may not necessarily provide the required information or the appropriate responses to the system. This may occur due to inefficiency of the system in interpreting the user queries and providing the same to the expert. In another scenario, this may occur due to inefficiency of the system to interpret the responses obtained from the expert. To overcome this situation, the system may redirect the user to directly communicate with the expert when the system is unable to provide the responses. But here, the user has to repeat full conversation to the expert, i.e., the conversation which has already happened between the system and the user. This effectively results in wasting of time and system resources. Therefore, it is important that the system interprets the input from the user and the expert appropriately to efficiently determine what the user is asking for.

Some of the existing techniques provide a summary of the conversation between the user and the system to the expert to provide the responses instead of repeating the full conversation. The summary may be based on keywords that may ignore a context of the user queries and hence may not be a correct interpretation of the user queries. Consequently, the responses determined by the system corresponding to the user queries may not be correct or satisfactory to the user.

Further, in the existing multimodal cognitive systems, the user queries may be ingested through various modalities such as stylus (ex. pointer), accelerometer, text, audio, or video. To make the conversations more effective and meaningful and for better interpretation of the user queries, the multimodal cognitive systems may obtain additional information from user, those which cannot be expressed through words or text but requires a pointing device or mouse. For example, one of such inputs may include a user to point a location on a map rendered on a screen of an electronic device associated with the user. However, the existing systems lack the ability to correctly determine which input mode to be considered for receiving the aforementioned inputs to better determine response to a previously submitted user queries.

Therefore, there exists a need for a robust, intelligent, interactive, and an efficient mechanism for determining most relevant responses to user queries submitted by a user, while reducing the redundancy in information exchange between the system, the user, and an expert.

SUMMARY

Disclosed herein is a method of processing multimodal user queries. The method comprises determining, by a response generation system, availability of one or more responses to each of one or more sub-queries, wherein the one or more sub-queries are formed by splitting the multimodal user queries. The method detects requirement of an expert to provide the one or more responses upon determining at least one of unavailability of the one or more responses by the response generation system or based on a first pre-defined condition. Thereafter, a summarized content is generated by summarizing context of the one or more sub-queries and historical conversation data associated with the one or more sub-queries. Based on the summarized content, the one or more sub-queries are reformulated. Finally, the one or more responses received, from the expert, for the reformulated one or more sub-queries are provided as the one or more responses for the multimodal user queries.

Further, the present disclosure relates to a response generation system for processing multimodal user queries. The response generation system includes a processor and a memory. The memory is communicatively coupled to the processor and stores processor-executable instructions, which on execution, cause the processor to determine availability of one or more responses to each of one or more sub-queries, wherein the one or more sub-queries are formed by splitting the multimodal user queries. The processor then detects requirement of an expert to provide the one or more responses upon determining at least one of unavailability of the one or more responses by the response generation system or based on a first pre-defined condition. Thereafter, the processor generates a summarized content by summarizing context of the one or more sub-queries and historical conversation data associated with the one or more sub-queries. Based on the summarized content, the processor reformulates the one or more sub-queries. Finally, the processor collates the one or more responses, received from the expert, for the reformulated one or more sub-queries. The collated one or more responses are provided as the one or more responses for the multimodal user queries.

Furthermore, the present disclosure relates to a non-transitory computer readable medium including instructions stored thereon that when processed by at least one processor causes a response generation system to perform operations comprising determining availability of one or more responses to each of one or more sub-queries, wherein the one or more sub-queries are formed by splitting the multimodal user queries. The instructions further cause the response generation system to detect requirement of an expert to provide the one or more responses upon determining at least one of unavailability of the one or more responses by the response generation system or based on a first pre-defined condition. Thereafter, the instructions cause the response generation system to generate a summarized content by summarizing context of the one or more sub-queries and historical conversation data associated with the one or more sub-queries, upon generating the summarized content, the instructions cause the response generation system to reformulate the one or more sub-queries based on the summarized content and to collate the one or more responses received, from the expert, for the reformulated one or more sub-queries.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for processing multimodal user queries. The system processes the multimodal user queries to generate one or more responses. The multimodal user queries comprise user queries provided in one or more input formats such as text, audio, gesture, and the like. The system determines availability of the one or more responses for one or more sub-queries. The one or more sub-queries are formed by splitting the multimodal user queries. The system identifies domain of the one or more sub-queries and based on the domain, parses database associated with the system for providing the one or more responses. If the one or more responses are available in the database, the system provides the one or more response for the one or more sub-queries. If the one or more responses are unavailable in the database or if there is ambiguity in the one or more sub-queries or when there is unavailability of a unique response to the one or more sub-queries, the system detects requirement of an expert to provide the one or more responses.

Upon determining requirement of expert intervention, the system generates a summarized content by summarizing context of the one or more sub-queries and historical conversation data associated with the one or more sub-queries. Based on the summarized content, the system reformulates the one or more sub-queries and provides the reformulated one or more sub-queries to the expert. The system receives the one or more response from the expert for the reformulated one or more sub-queries. The one or more responses are collated by the system and provided as a response to the multimodal user queries. In the present disclosure, since the summarized content is provided to the expert, the user need not repeat the queries when the system is unable to provide the responses and hence reduces the time required in providing the responses with minimal usage of the system resources.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
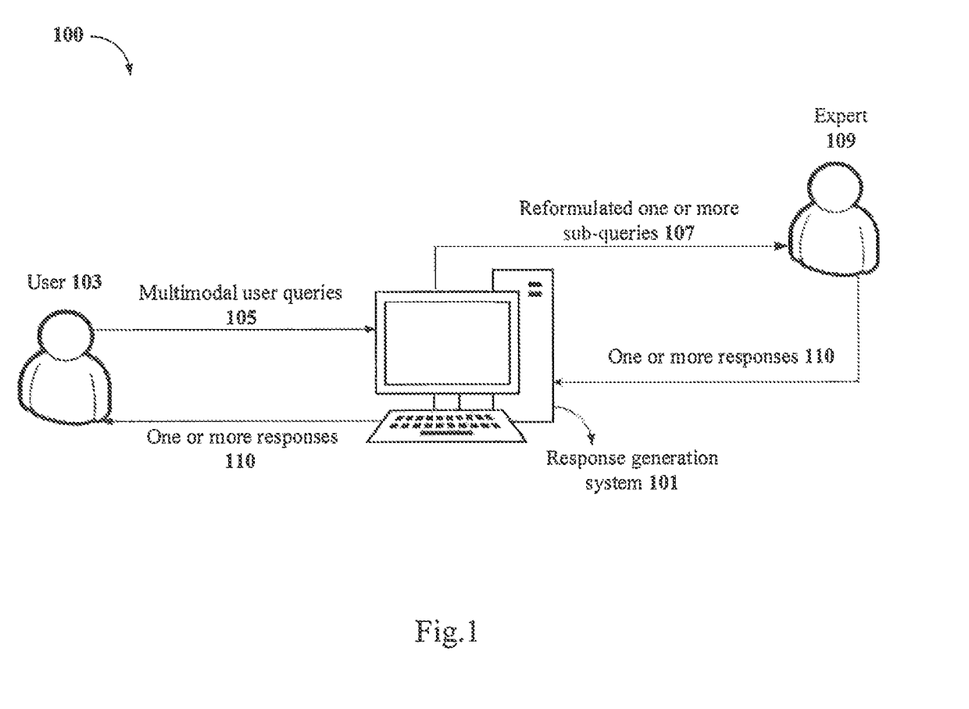
FIG. 1 illustrates an exemplary environment for processing multimodal user queries in accordance with some embodiments of the present disclosure.

FIG. 1 illustrates an exemplary environment for processing multimodal user queries in accordance with some embodiments of the present disclosure.

The environment 100 includes a response generation system 101, a user 103 and an expert 109. Although the method for processing multimodal user queries 105 is described in conjunction with the system 101, the said method can also be implemented in a server. In an embodiment, the response generation system 101 may receive the multimodal user queries 105 from the user 103 through an electronic device associated with the user 103. The multimodal user queries 105 comprise user queries provided in one or more input formats such as text, audio, gesture, and the like. Upon receiving the multimodal user queries 105, the response generation system 101 splits the multimodal user queries 105 into one or more sub-queries 106 [not shown in FIG. 1]. In an embodiment, the response generation system 101 may include a database to store one or more responses 110 for the queries related to various domains such as banking, robotics, automobile, real-estate, medicine, education, information technology and the like. The response generation system 101 determines availability of the one or more responses 110 for the one or more sub-queries 106 based on domain-specific keywords in the one or more sub-queries 106.

In an embodiment, the response generation system 101 may create an input frame comprising one or more input slots. The count of one or more input slots depends on the count of the one or more sub-queries 106. As an example, if there are four sub-queries, four input slots would be created in the input frame wherein each input slot corresponds to each sub-query. The response identified for each sub-query is filled in its corresponding input slot. The response generation system 101 determines availability of the one or more responses 110 for the one or more sub-queries 106. If the one or more responses 110 are available, the one or more responses 110 are filled or occupied in the respective input slots and the one or more responses 110 are provided to the user. If the one or more responses 110 are unavailable in the database or based on a first predefined condition, the response generation system 101 detects requirement of an expert 109 to provide the one or more responses 110. The first predefined condition comprises detecting an ambiguity in the one or more sub-queries 106 based on a vacancy in the one or more input slots or upon detecting unavailability of a unique response to the one or more input slots created.

In a scenario, the inability of the response generation system 101 in finding the one or more response may be attributed to difficulty in interpreting the one or more sub-queries 106 owing to ambiguity in the one or more sub-queries 106. In such a scenario, the one or more input slots corresponding to the one or more sub-queries 106 may be left vacant.

In another scenario, the unavailability of the unique response may be detected based on weightage or rank associated with the each of the one or more responses 110. The weightage or rank may be associated with each of the one or more responses 110 based on relevance of each of the one or more responses 110 for the one or more sub-queries 106. When the one or more responses 110 are different but with a close weightage or a rank then the response generation system 101 may find difficulty in identifying a unique response to the one or more sub-queries 106.

Upon detection of a requirement of an expert 109 for providing the one or more responses 110, the response generation system 101 may generate a summarized content 107 [not shown in FIG. 1] by summarizing context of the one or more sub-queries 106 and historical conversation data associated with the one or more sub-queries 106. In an embodiment, the historical conversation data may include, but is not limited to, data related to previous conversations of the user with the response generation system 101 for previous multimodal user queries and/or information such as background of the user. The information pertaining to the background may include, but is not limited to, professional background of the user, age of the user, area of expertise of the user, health status of the user, educational background, and the like.

In an embodiment, the response generation system 101 may reformulate the one or more sub-queries 106 based on the summarized content 107 and provides the summarized content 107 to the expert 109. In an embodiment, the response generation system 101 creates an output frame comprising one or more output slots for the reformulated one or more sub-queries 108. The count of the one or more output slots depends on count of the reformulated one or more sub-queries 108. If there are three reformulated sub-queries then three output slots would be created, wherein for each output slot corresponds to each reformulated sub-query.

Further, the response generation system 101 may determine availability of the response for each of the reformulated one or more sub-queries 108. The one or more responses 110 provided by the expert 109 may be filled in the respective output slot. Once all the output slots are filled, the response generation system 101 determines the availability of the one or more responses 110 for each of the reformulated one or more sub-queries 108. If some of the output slots are vacant, then the response generation system 101 detects unavailability of the one or more responses 110. The expert 109 may not have provided the response due to insufficiency in the reformulated one or more sub-queries 108. Therefore, the response generation system 101 may query the user for providing additional information and till the reformulated one or more sub-queries 108 are comprehensible to the expert 109. If the one or more sub-queries 106 are comprehensible by the expert 109 then all the output slots may be filled with the one or more responses 110. If the one or more sub-queries 106 are not comprehensible by the expert 109 then the one or more one or more output slots may be vacant. The detection of the vacant output slots indicates that the one or more sub-queries 106 are not comprehensible by the expert 109. But, once all the output slots are filled with the one or more responses 110, the response generation system 101 collates the one or more responses 110 and provides the one or more responses 110 to the user.

Figure 2:
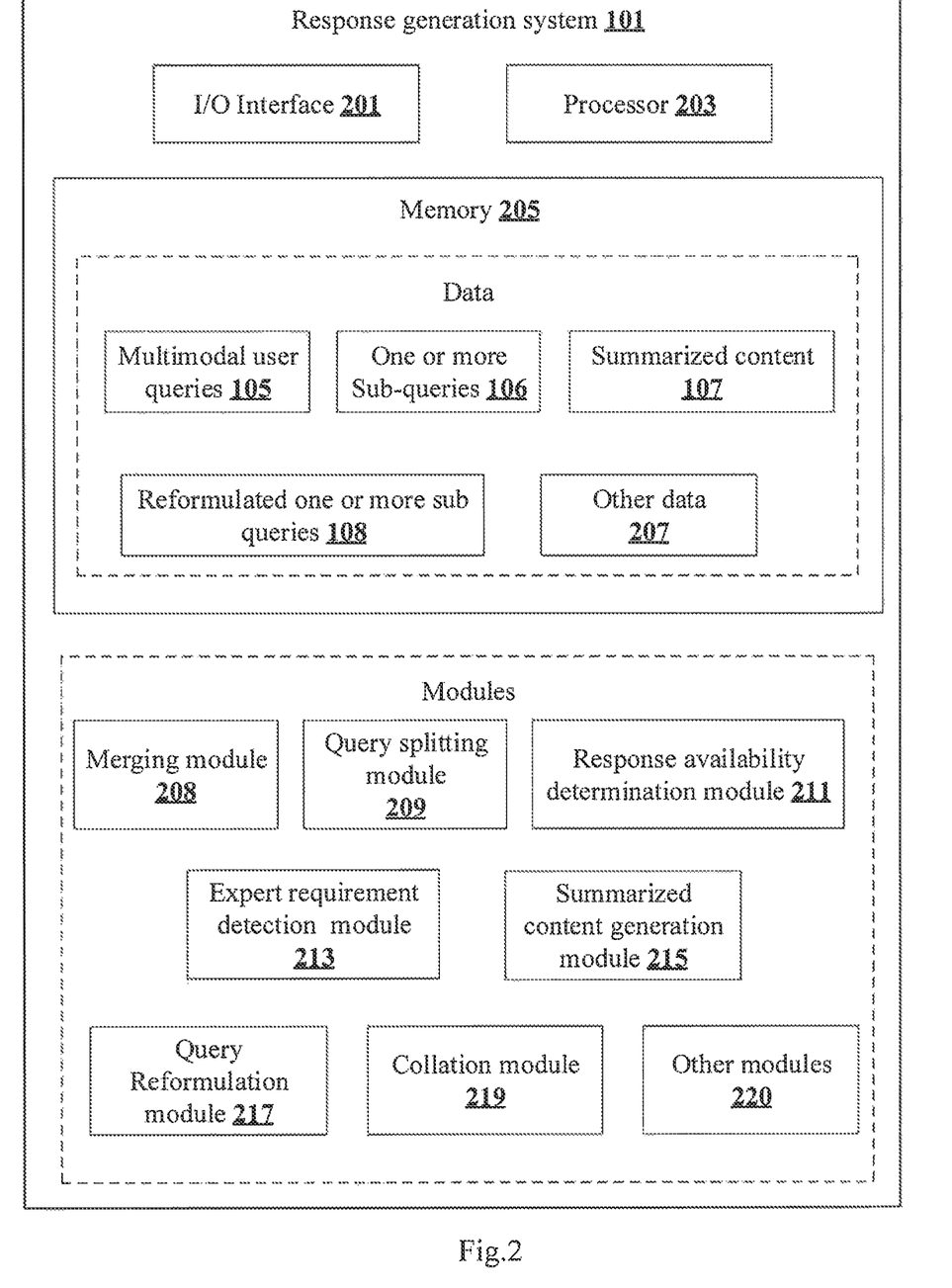
FIG. 2 shows a detailed block diagram illustrating a response generation system in accordance with some embodiments of the present disclosure.

FIG. 2 shows a detailed block diagram illustrating a response generation system in accordance with some embodiments of the present disclosure.

The response generation system 101 may include an I/O interface 201, a processor 203, and a memory 205. The I/O interface 201 may be configured to communicate with the user 103, through one or more electronic devices associated with the user 103, to receive the multimodal user queries 105 and to provide one or more responses 110 for the multimodal user queries 105. The memory 205 may be communicatively coupled to the processor 203. The processor 203 may be configured to perform one or more functions of the response generation system 101 for processing the multimodal user queries 105.

In some implementations, the response generation system 101 may include data and modules for performing various operations in accordance with the embodiments of the present disclosure. In an embodiment, the data may be stored within the memory 205 and may include, without limiting to, multimodal user queries 105, one or more sub-queries 106, summarized content 107, reformulated one or more sub-queries 108 and other data 207.

In some embodiments, the data may be stored within the memory 205 in the form of various data structures. Additionally, the data 207 may be organized using data models, such as relational or hierarchical data models. The other data 207 may store data, including temporary data and temporary files, generated by the modules for performing various functions of the response generation system 101.

In an embodiment, the multimodal user queries 105 may be received from the user 103 through I/O interface 201 of the response generation system 101. As an example, the multimodal user queries 105 may be received in one or more forms including, without limitation, text (e.g. e-mail communication), audio (pre-recorded voice), speech, narration, gesture, and the like. The user may provide the multimodal user queries 105 using an electronic device associated with the user 103. In an embodiment, the electronic device (not shown in figures) associated with the user 103 may include a smartphone, a Personal Assistance Device (PDA) or a computing device, and may be used as an intermediate communication medium between the user 103 and the response generation system 101. The electronic device may receive the multimodal user queries 105 from the user 103 and transmit it to the response generation system 101. Similarly, the electronic device may receive the one or more responses 110 from the response generation system 101. In an embodiment, the electronic device may be configured to perform each functionality of the response generation system 101 without deviating from the scope of the present disclosure.

In an embodiment, the response generation system 101 may split the multimodal user queries 105 into one or more sub-queries 106. Each of the one or more sub-queries 106 may belong to one or more domains such as banking, insurance, healthcare, telecom, education, and the like.

In an embodiment, the one or more sub-queries 106 may be created by the response generation system 101 by splitting the multimodal user queries 105. Initially, the response generation system 101 may analyze the multimodal user queries 105, which is in the form of natural language, using one or more Natural Language Processing (NLP) techniques to identify one or more distinct contexts in the multimodal user queries 105. Thereafter, the response generation system 101 may split the multimodal user queries 105 into the one or more sub-queries 106, such that, each of the one or more sub-queries 106 indicate distinct contexts of the multimodal user queries 105.

As an example, consider a multimodal user query—"My scooter, bought 8 years back, for 10 years of payment, is stolen. Is there any reduction in the EMI that I need to pay?".

Here, upon analyzing a first part of the multimodal user query—"My scooter, bought 8 years back, for 10 years of payment, is stolen", the response generation system 101 may identify keywords such as—'scooter', 'stolen', '8 years', '10 years', and 'payment'. Based on the keywords, the response generation system 101 may determine that the first part of the user query 104 is related to 'stealing of vehicle'.

Similarly, upon analyzing a second part of the multimodal user query 104—"Is there any reduction in the EMI that I need to pay?", the response generation system 101 may identify keywords such as, 'reduction of EMI', 'pay'. Based on these keywords, the response generation system 101 may determine that the second part of the user query 104 is related to 'reduction in EMI payment'.

Based on the above analysis, the response generation system 101 may split the multimodal user queries 105 into two sub-queries 106 as indicated below:

Sub-query 1: "My scooter, bought 8 years back, for 10 years of payment, is stolen"

Sub-query 2: "Is there any reduction in the EMI that I need to pay?"

Further, the response generation system 101 may determine domain of the sub-queries 1 and 2, based on the one or more keywords present in the sub-queries 1 and 2. Accordingly, the sub-query 1 may be determined to be belonging to 'Insurance' or 'Public law' domain, since it is related to 'stealing of the vehicle'. Similarly, the sub-query 2 may be determined to be belonging to 'Banking' domain, since it is related to 'reduction in EMI'. As an example, the one or more responses 110 related to "banking" domain may be stored in a database named as "Banking". Similarly, the one or more responses 110 related to "insurance" domain may be stored in a database named as "Insurance". So, when the domain of the sub-query is detected, the response generation system 101 retrieves the response form the corresponding database.

In an embodiment, the response generation system 101 may generate a summarized content 107 by summarizing context of the one or more sub-queries 106 and historical conversation data associated with the one or more sub-queries 106. As an example, the one or more sub-queries 106 and the one or more responses 110 provided by the response generation system 101 may be as follows:

Sub-Query: How do I start to do business with stocks
System Response: Open D-mat account
Sub-Query: How to do that
System Response: Submit ID proof
Sub-Query: I have 5-year-old ID proof. Is it valid?

For the above Sub-Query 3, when the response generation system 101 may be unable to provide the response, the response generation system 101 detects the requirement of the expert 109 to provide the one or more responses 110. Therefore, the response generation system 101 provides the summarized content 107 by summarizing the context of the above mentioned Sub-Query 3 and based on historical conversation data, with the help of a Natural Language Generation [NLG] unit associated with the response generation system 101. The response for the Sub-Query 3 is dependent on the sub-queries 1 and 2 and the responses for the sub-queries 1 and 2. Therefore, the summarization is based on the context of the sub-queries 1 and 2 and the responses of the sub-queries 1 and 2 as well. Therefore, the context identified in this example is "Opening D-mat account" and "ID proof". Here, the NLG unit helps in generating "English sentences", which are the reformulated one or more sub-queries 108, for the expert 109 to understand the reformulated one or more sub-queries 108. In this example, "I" in the Sub-Query 3 will be replaced with "John aged 22". The information of name and age of the user is obtained from the historical conversation data. The sentences "I have 5-year-old ID proof. Is it valid, is summarized as "John aged 22 years has 5-year-old ID proof to open D-mat account". Is it valid?

In an embodiment, one or more modules may process the data of the response generation system 101. In one implementation, the one or more modules may be stored as a part of the processor 203. In another implementation, the one or more modules may be communicatively coupled to the processor 203 for performing one or more functions of the response generation system 101. The modules may include, without limiting to, a query splitting module 209, a response availability determination module 211, expert requirement detection module 213, summarized content generation module 215, query reformulation module 217, collation module 219 and other modules 220.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 220 may be used to perform various miscellaneous functionalities of the response generation system 101. It will be appreciated that such modules may be represented as a single module or a combination of different modules. Furthermore, a person of ordinary skill in the art will appreciate that in an implementation, the one or more modules may be stored in the memory 205, without limiting the scope of the disclosure.

In an embodiment, the merging module 208 may be configured to combine the multimodal user queries 105 provided in the one or more input formats. As an example, the input format may be audio, video, text, gesture, and the like. The gesture format may further include, facial gestures, eye gesture, body gesture, finger gesture and the like. The merging module 208 merges the relevant information from different input formats used while providing the multimodal user queries 105. For example, the information from the facial gesture and the voice provided through the speech input may be merged by the merging module 208. As an example, a Bayesian network model may be used for merging information from various input formats. The information from the different input formats may be merged based on a weightage assigned to each of the one or more input formats. The input formats with weightages exceeding predefined weightages is considered for merging. In a similar manner, the one or more responses 110 received for the multimodal user queries 105 may also be multimodal. Therefore, the merging module 208 may be used for combining the information from the various input formats used while providing the one or more responses 110.

In an embodiment, the query splitting module 209 may be responsible for splitting the multimodal user queries 105 into one or more sub-queries 106. As an example, the query splitting module 209 may split the multimodal user queries 105 by identifying one or more distinct contexts in the multimodal user queries 105. In an embodiment, once the multimodal user queries 105 may be split into the one or more sub-queries 106, the one or more sub-queries 106 may be independent in nature such that, the context of each of the one or more sub-queries 106 is different from each other. Alternatively, the one or more sub-queries 106 may be inter-dependent in nature such that, the context of the one or more sub-queries 106 may be related. When the one or more sub-queries 106 are inter-dependent in nature, the response of one of the one or more sub-queries 106 may be used as an input for retrieving the response to other sub-queries 106.

For example, consider the multimodal user query 105— "My scooter, bought 8 years back, for 10 years of payment, is stolen. Is there a reduction in the EMI I need to pay?". The query splitting module 209 may split the above multimodal user query 105 into two sub-queries 106 as indicated below:

Sub-query 1: "My scooter, bought 8 years back, for 10 years of payment, is stolen"

Sub-query 2: "Is there any reduction in the EMI that I need to pay?"

Here, the Sub-query 1 and Sub-query 2 are inter-dependent, such that, the response to sub-query 1 serves as an input to the Sub-query 2.

Suppose, the response to sub-query 1 is—"there will be a reimbursement of Rs 10,000 as an insurance claim for the vehicle". Now, the response of the sub-query 1, along with the Sub-query 2 is analyzed further to calculate the reduction in EMI. Therefore, the response to Sub-query 2 may be— "EMI for rest of the 2 years would be reduced to Rs. 981".

In an embodiment, the response availability determination module 211 may be configured to determine availability of the one or more responses 110 for the multimodal user queries 105. As an example, the multimodal user query may be "My scooter, bought 8 years back, for 10 years of payment, is stolen. Is there a reduction in the EMI I need to pay?". The one or more sub-queries 106 identified are:

Sub-query 1: "My scooter, bought 8 years back, for 10 years of payment, is stolen"

Sub-query 2: "Is there any reduction in the EMI that I need to pay?"

The response generation system 101 creates an input frame comprising one or more input slots. The count of input slots depends on count of the one or more sub-queries 106. In this exemplary scenario, since there are two sub-queries, the response generation system 101 creates two inputs slots in the input frame as shown below.

| Input Frame | |
| --- | --- |
| Input Slot-1 | Input Slot-2 |
| Response to-be-filled for Sub-Query 1, (i.e., the Input Slot 1 is filled, only upon detection of availability of the response for Sub-Query 1 with the response genteration system 101) | Response to-be-filled for Sub-Query 2, (i.e., the Input Slot 2 is filled, only upon detection of availability of the response for Sub-Query 2 with the response genteration system 101) |

The Input Slot 1 corresponds to sub-query 1 and the Input Slot 2 corresponds to the sub-query 2.

The response generation system 101 identifies the domain of the sub-query 1 as "Banking" and retrieves the response from the database named "Banking"

Sub-query 1: "My scooter, bought 8 years back, for 10 years of payment, is stolen"

Response: There will be a reimbursement of Rs 10,000 as an insurance claim for the vehicle The response for the Sub-query 1 is filled in the Input Slot-1 as shown below.

| Input Frame | |
| --- | --- |
| Input Slot-1 | Input Slot-2 |
| There will be a reimbursement of Rs 10,000 as an insurance claim for the vehicle | |

However, the response for the sub-query 2 may not be available with the response generation system 101 and hence the input slot 2 remains unfilled. The response availability determination module 211 detects the availability of the one or more responses 110 to the one or more sub-queries 106 when each of the one or more input slots are occupied with one of the one or more responses 110 and when weighted sum of each of the one or more responses 110 exceed a predefined threshold value. In this scenario, only the input slot-1 is filled and the input slot-2 is unfilled. Therefore, the weighted sum of each of the one or more responses 110 are less than a predefined threshold value. The weighted sum is obtained based on a second pre-defined condition comprising a degree of matching a keyword in each of the one or more sub-queries 106 with the one or more responses 110 provided by the response generation system 101, a confidence level in each of the one or more responses 110, or a count of responses provided by the response generation system 101. In an embodiment, the predefined threshold value is determined based on one or more parameters such as impact of the response on the user, sensitivity of the query and the like. The predefined threshold value is specific to the one or more sub-queries 106. As an example, for the sub-query 2, since it is a sensitive question, the predefined threshold value set may be 0.9. If the sub-query 2 was a normal question then the predefined threshold value set may be lesser than 0.9 as an example, 0.6. Now when the response generation system 101 provides one or more responses for the sub-query 2, and when each of the one or more responses 110 have same weighted sum, then the response generation system 101 may detect the need of the expert 109 for providing the one or more responses for the sub-query 2. Therefore, the response availability determination module 211 detects that the response is unavailable for the multimodal user query 105 by the response generation system 101.

The expert requirement detection module 213 may be configured to determine the requirement of the expert 109 for providing the one or more responses 110 The expert requirement detection module 213 detects requirement of the expert 109 to provide the one or more responses 110 upon detecting unavailability of the one or more responses 110 or based on a first pre-defined condition. The first predefined condition may be detection of an ambiguity in the one or more sub-queries 106 based on a vacancy in the one or more input slots or unavailability of a unique response to the one or more input slots. In the example, illustrated above, since the response for the Input Slot-2 is unavailable, and weighted sum of each of the one or more responses 110 is less than the predefined threshold value, the expert requirement detection module 213 detects the requirement of the expert 109 to provide the one or more responses 110 for the sub-query 2.

In an embodiment, the summarized content generation module 215 may be configured to summarize the one or more sub-queries 106 based on context of the one or more sub-queries 106 and based on historical conversation data associated with the one or more sub-queries 106. As an example, the multimodal user query 105 received from the user may be:

Multimodal user Query: "My scooter, bought 8 years back, for 10 years of payment, is stolen. Is there a reduction in the EMI I need to pay?

The response generation system 101 splits the multimodal user query 105 into the one or more sub-queries 106 as given below.

Sub-query 1: "The scooter I bought, 8 years back, for 10 years of payment, is stolen"
Sub-query 2: "Is there any reduction in the EMI that I need to pay?"

The response generation system 101 may determine the unavailability of the one or more responses 110 for the Sub-query 2 and hence detects the requirement of the expert 109 to provide the one or more responses 110. The response generation system 101 detects that the response of sub-query 2 is dependent on response of sub-query 1. Therefore, the summarized content generation module 215 detects the context of the Sub-query 1, Sub-query 2, response of the Sub-query 1 and based on historical conversation data such as previous conversations by the user 103, generates a summarized content 107. During the previous conversation, the response generation system 101 may have identified information such as type of vehicle and the like. Based on these information, the query reformulation module 217 reformulates the one or more sub-queries 106 as given below and provides the reformulated one or more sub-queries 108 to the expert 109.

Reformulated sub-query: The scooter bought, 8 years back, for 10 years of payment, is stolen, will there be any reduction in the EMI?
The reformulated sub-query 1: The scooter is bought 8 years back for 10 years of payment
The reformulated sub-query 2: Is there any reduction in the EMI In an embodiment, the response generation system 101 creates an output frame comprising one or more output slots. The count of one or more output slots depends on count of the reformulated one or more queries. As an example, two output slots may be created since there are two reformulated sub-queries as shown below. The response generation system 101 retrieves the output for the Sub-query 1 and fills the output in the output slot-1. The response received from the expert 109 for the Sub-query 2 is filled in the output slot-2.

The response received from the expert 109 for the Sub-query 2 is "EMI for rest of the 2 years would be reduced to Rs. 981".

| Output Frame | |
|---|---|
| Output Slot-1 | Output Slot-2 |
| There will be a reimbursement of Rs 10,000 as an insurance claim for the vehicle | EMI for rest of the 2 years would be reduced to Rs. 981 |

Since both the output slots are filled in the output frame and the weighted sum of each of the one or more responses 110 is greater than the predefined threshold value, the response generation system 101 detects the availability of the one or more responses 110 for the multimodal user query 105.

In an exemplary embodiment, the expert 109 may not provide the response for the Sub-query 2 and hence the out-put slot corresponding to the Sub-query 2 may be vacant. In such scenarios, the response generation system 101 may further interact with the expert 109 and provide one or more queries to understand if the Sub-query 2 is comprehensible by the expert 109. For each of the one or more queries, the response generation system 101 may again create another output frame with one or more output slots. Once each of the one or more output slots are filled, the response generation system 101 may comprehend that the Sub-query 2 is comprehensible by the expert 109. This process is continued until the response generation system 101 receives the one or more responses 110 for each of the one or more sub-queries 106.

In an embodiment, the collation module 219 may be configured to collate the one or more responses 110 in the output frame and provide the one or more responses 110 to the user 103. The collation module 219 also filters one or more duplicate sentences if any in the one or more responses 110 prior to providing the one or more responses 110 to the user 103.

Figure 3:
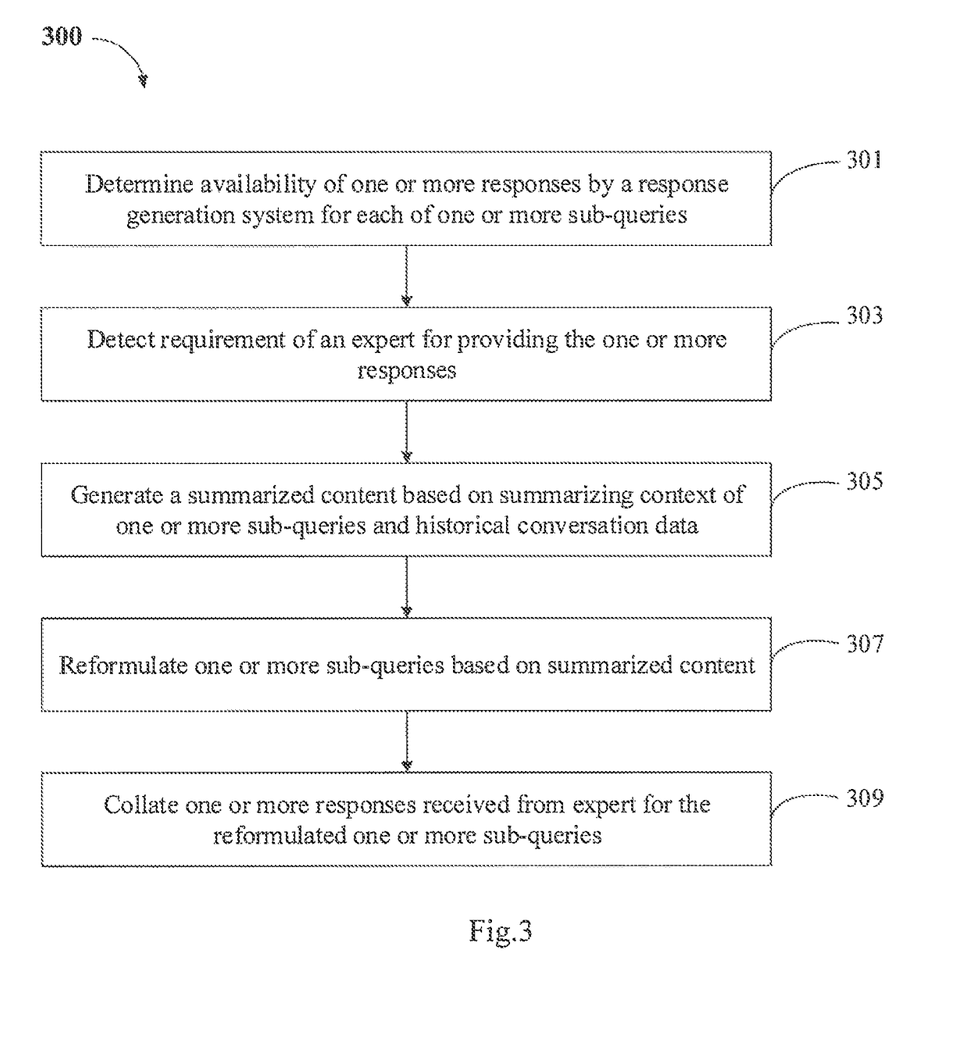
FIG. 3 shows a flowchart illustrating a method for processing multimodal user queries in accordance with some embodiments of the present disclosure.

FIG. 3 shows a flowchart illustrating a method for processing multimodal user queries in accordance with some embodiments of the present disclosure.

As illustrated in FIG. 3, the method 300 includes one or more blocks illustrating a method for processing multimodal user queries 105, for example the response generation system 101 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes splitting, by the response generation system 101, the multimodal user query 105 into one or more sub-queries 106. In an embodiment, the multimodal user query 105 may be split into the one or more sub-queries 106 by analyzing the multimodal user query 105 using one or more natural processing techniques.

At block 303, the method 300 includes determining, by the response generation system 101, determining availability of one or more responses 110 for the one or more sub-queries 106 with the response generation system 101. If the one or more responses 110 is available with the response generation system 101, the response generation system 101 provides the one or more responses 110 to the user 103. If the one or more responses 110 are unavailable with the response generation system 101 or when there is an ambiguity in the one or more sub-queries 106, or when there is unavailability of a unique response for the one or more sub-queries 106, the response generation system 101 detects requirement of the expert 109 for providing the one or more responses 110.

At block 305, the method 300 includes generating, by the response generation system 101, a summarized content 107 by summarizing the one or more sub-queries 106 and historical conversation data associated with the one or more sub-queries 106. The historical conversation data may be based on previous conversation of the user 103 with the response generation system 101. The historical conversation data may provide information such as age of the user 103, assets associated with the user 103, health status of the user 103 and the like.

At block 307, the method 300 includes, reformulating one or more sub-queries 106 based on the summarized content 107. As an example a NLG technique is used to reform the one or more sub-queries 106 and provide the reformulated one or more sub-queries 108 in "English language" format to the expert 109.

At block 309, the method 300 includes collating, by the response generation system 101, the one or more responses 110 received from the expert 109 for the reformulated one or more sub-queries 108. The response generation system 101 removes duplicate sentences from the one or more responses 110 and provides the one or more responses 110 to the user 103.

Computer System

Figure 4:
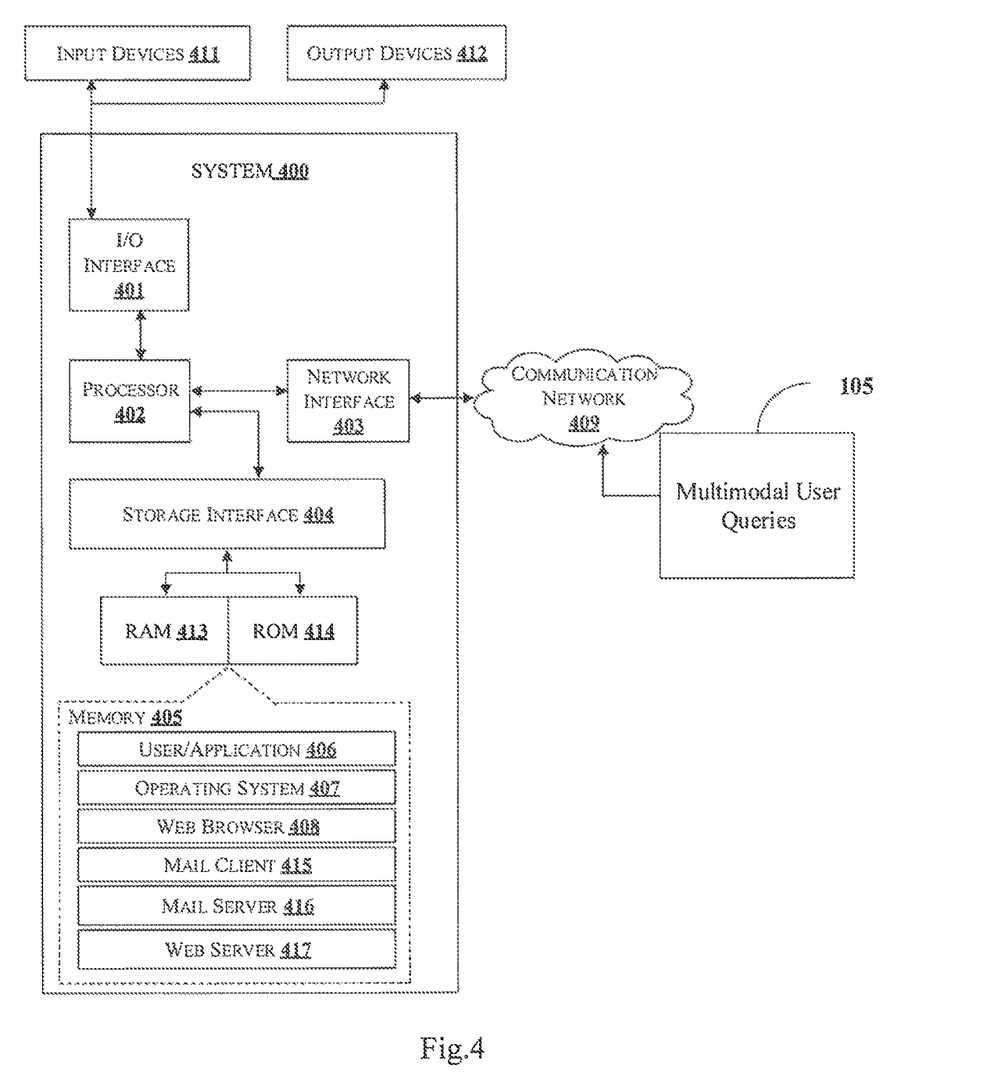
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be response generation system 101, which is used for processing multimodal user queries 105. The computer system 400 may include a central processing unit ("CPU" or "processor") 402. The processor 402 may comprise at least one data processor for executing program components for executing user- or system-generated business processes. A user 103 may include a person, a user 103 in the computing environment 100, a user 103 querying the response generation system 101, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device, such as a smartphone, a laptop, or a desktop computer associated with the user 103, through which the user 103 interacts with the response generation system 101.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the user 103 to receive the multimodal user queries 105 and to provide the one or more responses 110.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media. Advantages of the embodiment of the present disclosure are illustrated herein.

In an embodiment, the present disclosure discloses a method and a system for processing multimodal user queries.

In an embodiment, the method of present disclosure avoids the need of user repeating user queries when the user queries are directed to an expert. In the present disclosure, the user conversations are summarized based on context and provided to the expert.

In an embodiment, the method of present disclosure chooses right input mode based on the context of the user query and hence enhances the user experience.

In an embodiment, though the expert is involved when the system is unable to provide the one or more responses, the system provides a seamless experience to the user wherein the user is unaware of the expert being involved in providing the one or more responses.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals | |
|---|---|
| Reference Number | Description |
| 100 | Environment |
| 101 | Response generation system |
| 103 | User |
| 105 | Multimodal user queries |
| 106 | One or more Sub-queries |
| 108 | Reformulated one or more sub-queries |
| 107 | Summarized content |
| 109 | Expert |
| 110 | One or more responses |
| 201 | I/O interface |
| 203 | Processor |
| 205 | Memory |
| 207 | Other Data |
| 208 | Merging Module |
| 209 | Query Splitting module |
| 211 | Response availability determination module |
| 213 | Expert requirement detection module |
| 215 | Summarized content generation module |
| 217 | Query reformulation module |
| 219 | Collation module |
| 220 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | PAM |
| 414 | ROM |

I claim:

1. A method of processing multimodal user queries, the method comprising:
splitting, by a response generation system, the multimodal user queries into a plurality of sub-queries by identifying one or more distinct contexts in the multimodal user queries, wherein the multimodal user queries is obtained by merging relevant information of user queries in one or more inputs formats comprising text, audio and gesture;

determining, by the response generation system, availability of one or more responses in a database, to each of the plurality of sub-queries based on domain-specific keywords in the plurality of sub-queries, determining, by the response generation system, that context of a first sub-query and a second sub-query in the plurality of sub-queries is inter-dependent with respect to each other such that a response to first sub-query serves as an input to the second sub-query;

detecting, by the response generation system, requirement of an expert to provide the one or more responses to the second sub-query upon determining unavailability of the one or more responses to the second sub-query in the database;

generating, by the response generation system, a summarized content by summarizing context of: the first sub-query and the second sub-query that have inter-dependent context, and response of the first sub-query, and historical conversation data specific to the user associated with the one or more sub-queries, using one or more Natural Language Processing (NLP) techniques, wherein the historical conversation data comprises: data related to previous conversations of the user with the response generation system for previous multimodal user queries and background information of the user;

reformulating, by the response generation system, the second sub-query based on the summarized content;

collating, by the response generation system, the one or more responses received, from the expert, for the reformulated second sub-query; and querying, by the response generation system, the user for receiving additional information upon identifying insufficiency in the reformulated second sub-query for providing the one or more responses to the second sub-query.

2. The method as claimed in claim 1 further comprises providing, by the response generation system, the one or more responses to the plurality of sub-queries upon detecting the availability of the one or more responses for the plurality of sub-queries.

3. The method as claimed in claim 1, wherein determining the availability of the one or more responses to the plurality of sub-queries comprises:

creating, dynamically, by the response generation system, an input frame comprising one or more input slots, wherein a count of the one or more input slots created depends on a count of the plurality of sub-queries; and detecting, by the response generation system, the availability of the one or more responses to the plurality of sub-queries when each of the one or more input slots are occupied with respective one of the one or more responses and when weighted sum of each of the one or more responses exceed a predefined threshold value.

4. The method as claimed in claim 3, wherein detecting requirement of the expert to provide the one or more responses to the second sub-query upon determining a first pre-defined condition, wherein the first pre-defined condition comprises:

detection of an ambiguity in the second sub-query based on a vacancy in the one or more input slots.

5. The method as claimed in claim 3, wherein the weighted sum is obtained based on a second pre-defined condition comprising a degree of matching a keyword in each of the plurality of sub-queries with the one or more responses provided by the response generation system, a confidence level in each of the one or more responses, or a count of responses provided by the response generation system.

6. The method as claimed in claim 1, wherein collating each of the one or more responses comprises:

creating, dynamically, by the response generation system, an output frame comprising one or more output slots, wherein a count of the one or more output slots created depends on a count of the reformulated second sub-query;

detecting, by the response generation system, an availability of the one or more responses for the reformulated second sub-query, from the expert, when each of the one or more output slots are occupied with one of the one or more responses; and collating, by the response generation system, each of the one or more responses upon detecting the availability of the one or more responses for the reformulated second sub-query.

7. The method as claimed in claim 6 further comprises detecting, by the response generation system, unavailability of the one or more responses to the second sub-query, from the expert, for the reformulated second sub-query when the one or more output slots are unoccupied with the one of the one or more responses to the second sub-query.

8. The method as claimed in claim 1, wherein the collating each of the one or more responses comprises removing duplicate sentences in each of the one or more responses.

9. A response generation system for processing multimodal user queries, the system comprising:

a processor; and a memory, communicatively coupled to the processor, wherein the memory stores processor-executable instructions, which, on execution, causes the processor to:

split the multimodal user queries into a plurality of sub-queries by identifying one or more distinct contexts in the multimodal user queries, wherein the multimodal user queries are obtained by merging relevant information of user queries in one or more inputs formats comprising text, audio and gesture;

determine availability of one or more responses in a database, to each of the plurality of sub-queries based on domain-specific keywords in the plurality of sub-queries, determining that context of a first sub-query and a second sub-query in the plurality of sub-queries is inter-dependent with respect to each other such that a response to first sub-query serves as an input to the second sub-query;

detect requirement of an expert to generate the one or more responses to the second sub-query upon determining unavailability of the one or more responses to the second sub-query in the database;

generate a summarized content by summarizing context of: the first sub-query and the second sub-query that have inter-dependent context, and response of the first sub-query, and historical conversation data specific to the user associated with the one or more sub-queries, using one or more Natural Language Processing (NLP) techniques, wherein the historical conversation data comprises: data related to previous conversations of the user with the response generation system for previous multimodal user queries and background information of the user;
reformulate the second sub-query based on the summarized content;
collate the one or more responses received, from the expert, for the reformulated second sub-query; and
query the user for receiving additional information upon identifying insufficiency in the reformulated second sub-query for providing the one or more responses to the second sub-query.

10. The response generation system as claimed in claim 9, wherein the processor provides the one or more responses to the plurality of sub-queries upon detecting the availability of the one or more responses for the plurality of sub-queries.

11. The response generation system 101 as claimed in claim 9, wherein, to determine the availability of the one or more responses to the plurality of sub-queries, the processor:
creates dynamically an input frame comprising one or more input slots, wherein a count of the one or more input slots created depends on a count of the plurality of sub-queries; and
detects the availability of the one or more responses to the plurality of sub-queries when each of the one or more input slots are occupied with respective one of the one or more responses and when weighted sum of each of the one or more responses match a predefined threshold value.

12. The response generation system as claimed in claim 11, wherein detecting requirement of the expert to provide the one or more responses to the second sub-query upon determining a first pre-defined condition, wherein the first pre-defined condition comprises:
detection of an ambiguity in the second sub-query based on a vacancy in the one or more input slots.

13. The response generation system as claimed in claim 11, wherein the weighted sum is obtained based on a second predefined condition comprising a degree of matching a keyword in each of the plurality of sub-queries with the one or more responses provided by the response generation system, a confidence level in each of the one or more responses or a count of responses provided by the response generation system.

14. The response generation system as claimed in claim 10, wherein to collate each of the one or more responses, the processor:
creates dynamically an output frame comprising one or more output slots, wherein a count of the one or more output slots created depends on a count of the reformulated second sub-query;
detects availability of the one or more responses for the reformulated second sub-query, from the expert, when each of the one or more output slots are occupied with one of the one or more responses; and
collates each of the one or more responses upon detecting the availability of the one or more responses for each of the reformulated second sub-query.

15. The response generation system as claimed in claim 9, wherein the processor detects unavailability of the one or more responses to the second sub-query, from the expert, for the reformulated second sub-query when the one or more output slots are unoccupied with the one of the one or more responses to the second sub-query.

16. A non-transitory computer readable medium including instructions stored thereon that when processed by at least one processor causes a response generation system to perform operations comprising:
splitting, by a response generation system, the multimodal user queries into a plurality of sub-queries by identifying one or more distinct contexts in the multimodal user queries, wherein the multimodal user queries is obtained by merging relevant information of user queries in one or more inputs formats comprising text, audio and gesture;
determining availability of one or more responses in a database, to each of the plurality of sub-queries based on domain-specific keywords in the plurality of sub-queries;
determining that context of a first sub-query and a second sub-query in the plurality of sub-queries is inter-dependent with respect to each other such that a response to first sub-query serves as an input to the second sub-query;
detecting requirement of an expert to provide the one or more responses to the second sub-query upon determining unavailability of the one or more responses to the second sub-query in the database;
generating a summarized content by summarizing context of: the first sub-query and the second sub-query that have inter-dependent context, and response of the first sub-query, and historical conversation data specific to the user associated with the one or more sub-queries, using one or more Natural Language Processing (NLP) techniques,
wherein the historical conversation data comprises: data related to previous conversations of the user with the response generation system for previous multimodal user queries and background information of the user;
reformulating the second sub-query based on the summarized content;
collating the one or more responses received, from the expert, for the reformulated second sub-query; and
querying the user for receiving additional information upon identifying insufficiency in the reformulated second sub-query for providing the one or more responses to the second sub-query.

* * * * *